United States Patent
Van Wassen et al.

(10) Patent No.: US 12,281,278 B2
(45) Date of Patent: Apr. 22, 2025

(54) THERMAL MANAGEMENT FLUIDS WITH SYNERGISTIC HEAT CAPACITY

(71) Applicant: EXXONMOBIL TECHNOLOGY AND ENGINEERING COMPANY, Spring, TX (US)

(72) Inventors: Abigail R. Van Wassen, Florham Park, NJ (US); Andrew E. Taggi, New Hope, PA (US); Shuji Luo, Basking Ridge, NJ (US); Gary Christensen, Wenonah, NJ (US); Kevin J. Kelly, Mullica Hill, NJ (US); Andrew D. Satterfield, Furlong, PA (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 0 days.

(21) Appl. No.: 18/546,460

(22) PCT Filed: Mar. 21, 2022

(86) PCT No.: PCT/US2022/071236
§ 371 (c)(1),
(2) Date: Aug. 15, 2023

(87) PCT Pub. No.: WO2022/232729
PCT Pub. Date: Nov. 3, 2022

(65) Prior Publication Data
US 2024/0301315 A1 Sep. 12, 2024

Related U.S. Application Data

(60) Provisional application No. 63/180,029, filed on Apr. 26, 2021.

(51) Int. Cl.
*C10M 161/00* (2006.01)
*C09K 5/10* (2006.01)
(Continued)

(52) U.S. Cl.
CPC .............. *C10M 161/00* (2013.01); *C09K 5/10* (2013.01); *C10M 129/08* (2013.01);
(Continued)

(58) Field of Classification Search
CPC .............. C10M 161/00; C10M 129/08; C10M 129/70; C10M 129/84; C10M 145/30;
(Continued)

(56) References Cited

U.S. PATENT DOCUMENTS 6,093,341 A 7/2000 Minks et al.
2019/0330506 A1 10/2019 Novek
(Continued)

FOREIGN PATENT DOCUMENTS

DE 19735334 A1 2/1999
DE 102007016738 A1 10/2008

OTHER PUBLICATIONS

Written Opinion and International Search Report from parent matter PCT/US2022/071236 mailed Jul. 4, 2022.

*Primary Examiner* — Ellen M Mcavoy
(74) *Attorney, Agent, or Firm* — Vorys, Sater, Seymour and Pease LLP

(57) ABSTRACT

Heat transfer fluids corresponding to mixtures of at least one hydrogen bond donor and at least one hydrogen bond acceptor are provided. The heat transfer fluids can have an unexpectedly high heat capacity relative to the expected heat capacity based on the heat capacities of the at least one hydrogen bond donor and the at least one hydrogen bond acceptor. In some aspects, the heat transfer fluids can also have a sufficiently high electrical resistivity to be suitable for use in environments such as heat management systems in electric vehicles.

16 Claims, 4 Drawing Sheets

(51) Int. Cl.
   *C10M 129/08* (2006.01)
   *C10M 129/70* (2006.01)
   *C10M 129/84* (2006.01)
   *C10M 145/30* (2006.01)
   *C10M 145/32* (2006.01)
   *C10N 40/00* (2006.01)

(52) U.S. Cl.
   CPC ........ *C10M 129/70* (2013.01); *C10M 129/84* (2013.01); *C10M 145/30* (2013.01); *C10M 145/32* (2013.01); *C10M 2207/022* (2013.01); *C10M 2207/281* (2013.01); *C10M 2207/32* (2013.01); *C10M 2209/105* (2013.01); *C10M 2209/106* (2013.01); *C10N 2040/40* (2020.05)

(58) Field of Classification Search
   CPC .......... C10M 145/32; C10M 2207/022; C10M 2207/281; C10M 2207/32; C10M 2209/105; C10M 2209/106; C09K 5/10; C10N 2040/40
   See application file for complete search history.

(56) References Cited

U.S. PATENT DOCUMENTS

| | | | |
|---|---|---|---|
| 2020/0153061 A1 | 5/2020 | Arai et al. | |
| 2022/0169906 A1* | 6/2022 | Yang | C09K 15/30 |
| 2022/0356389 A1* | 11/2022 | De Kimpe | C09K 5/20 |
| 2023/0383160 A1* | 11/2023 | Park | C23F 11/144 |
| 2023/0383163 A1* | 11/2023 | Park | C23F 11/10 |
| 2024/0047778 A1* | 2/2024 | Agiral | H01M 10/613 |
| 2024/0150636 A1* | 5/2024 | Garrett | H01M 10/613 |
| 2024/0158682 A1* | 5/2024 | Garrett | H01G 9/0003 |
| 2024/0191119 A1* | 6/2024 | Filip | H01M 10/6567 |

* cited by examiner

THERMAL MANAGEMENT FLUIDS WITH SYNERGISTIC HEAT CAPACITY

FIELD

Compositions are provided related to heat transfer fluids, such as heat transfer fluids and/or lubricants in electric vehicles.

BACKGROUND

Due in part to the increase in electric vehicles, electric motors are gaining a more prominent role in both commercial and private use. In many instances, the power for such electric motors is provided by battery storage associated with the electric motor. While such electric motors can be beneficial in a variety of settings, electric motors can provide several challenges that are not present for conventional combustion engines.

Some challenges for electric motors can be related to managing the temperature of the motor as well as the temperature of the associated battery storage. It is generally desirable to maintain the temperature of the electric motor during operation at less than 150° C., such as in the range of 80° C. to 150° C. With regard to battery storage, the preferred temperature range for many types of currently available batteries, such as Li-ion batteries can have an upper end of 50° C. or less. However, it is also desirable to avoid operating such batteries at temperatures below −20° C. Due to this relatively narrow temperature range for operation, there is an ongoing need for thermal management fluids that can be used in electric vehicles and/or other applications involving electric motors.

More generally, transfer of heat from local high temperature zones is a desirable performance feature of many types of lubricants and circulating fluids. In lubricated systems, examples of heat sources that require cooling include, but is not limited to, heat generated by combustion processes, heat resulting from friction within a lubricated contact, heat created by energy sources, and heat used in manufacturing processes (e.g., paper and steel making).

In other cases, some circulating fluids may be used primarily or even solely for the purpose of removing heat from high temperature zones and/or delivering heat to low temperature zones. Examples include coolants used in internal combustion engine applications, transformer oils used to cool electrical distribution equipment, and thermal management systems in electric and/or hybrid vehicles.

Heat transfer fluids typically remove heat via combinations of conductivity and convection mechanisms. The heat removed is a function of fluid properties such as heat capacity and thermal conductivity, system design including selection of materials that determine the heat flow across fluid/surface interfaces, and operational factors such as fluid flow rate and temperature difference between fluid and the high temperature zone requiring cooling.

It would be desirable to have improved heat transfer fluids, such as heat transfer fluids with increased heat capacity relative to the kinematic viscosity of the heat transfer fluid. It would further be desirable for the improved heat transfer fluids to have reduced or minimized electrical conductivity, so that the heat transfer fluids can be used in environments such as electric vehicle environments.

U.S. Patent Application Publication 2020/0199430 describes heat transfer fluids including mixtures of fully esterified esters and partially esterified esters. The mixtures of esters are described as having unexpected combinations of flash point, thermal conductivity, and/or kinematic viscosity.

U.S. Patent Application Publication 2018/0223211 describes low transition temperature mixtures corresponding to a eutectic mixture of a first component and a second component. The mixtures are described as being useful as lubricants. At least one of the first component and the second component is described as being a solid at 20° C., although the interaction between the first component and the second component causes the mixture to be a liquid at 20° C.

U.S. Pat. No. 7,608,198 describes water based mixtures for use as heat transfer fluids for fuel cell assemblies. Because of the inclusion of water in the mixtures, the electrical resistance of the mixtures tends to be relatively low. It is noted that Example 64 in the patent does not include water. The polyalkylene glycols described in that Example are believed to have an average molecular weight of roughly 740 g/mol.

SUMMARY

In an aspect, a heat transfer fluid is provided. The heat transfer fluid includes 10 wt % to 90 wt %, relative to a weight of the heat transfer fluid, of at least one hydrogen bond donor having a molecular weight of 60 g/mol or more and a first heat capacity, the at least one hydrogen bond donor comprising 1.0 wt % or more of hydrogen bond donor functional groups relative to the molecular weight of the at least one hydrogen bond donor. The heat transfer fluid further includes 10 wt % to 90 wt %, relative to a weight of the heat transfer fluid, of at least one hydrogen bond acceptor having a molecular weight of 60 g/mol or more and a second heat capacity, the at least one hydrogen bond acceptor comprising 1.0 wt % or more of hydrogen bond acceptor functional groups relative to the molecular weight of the at least one hydrogen bond acceptor. The heat transfer fluid further includes an electrical conductivity of 2.0 µS/cm or less. Additionally, in some aspects, the hydrogen bond donor does not contain hydrogen bond acceptor functional groups. Additionally, in some aspects, the hydrogen bond donor comprises one or more hydrogen bond acceptor functional groups, and 10 wt % or more of the hydrogen bond acceptor functional groups in the hydrogen bond acceptor, relative to the molecular weight of the hydrogen bond acceptor, are different from the hydrogen bond acceptor functional groups in the hydrogen bond donor.

In another aspect, a heat transfer fluid is provided. The heat transfer fluid includes 10 wt % to 90 wt %, relative to a weight of the heat transfer fluid, of at least one hydrogen bond donor having a molecular weight of 60 g/mol or more and a first heat capacity. The heat transfer fluid further includes 10 wt % to 90 wt %, relative to a weight of the heat transfer fluid, of at least one hydrogen bond acceptor having a molecular weight of 60 g/mol or more and a second heat capacity. The heat transfer fluid further includes an electrical conductivity of 2.0 µS/cm or less. Additionally, a heat capacity of the heat transfer fluid at a temperature between 0° C. and 150° C. can be greater than the first heat capacity at the temperature between 0° C. to 150° C. by 5.0% or more relative to the first heat capacity, and the heat capacity of the heat transfer fluid at the temperature between 0° C. and 150° C. can be greater than the second heat capacity at the temperature between 0° C. to 150° C. by 5% or more relative to the second heat capacity.

Optionally, a combined weight of the at least one hydrogen bond donor and the at least one hydrogen bond acceptor comprises 40 wt % or more of a weight of the heat transfer fluid.

Optionally, a weight of hydrogen bond donor functional groups of the at least one hydrogen bond donor comprises 5 wt % or more (or 10 wt % or more) of the molecular weight of the at least one hydrogen bond donor. Optionally, a weight of hydrogen bond acceptor functional groups of the at least one hydrogen bond acceptor comprises 5 wt % or more (or 10 wt % or more) of the molecular weight of the at least one hydrogen bond acceptor.

Optionally, the heat transfer fluid can be substantially free of water.

Optionally, i) the at least one hydrogen bond donor can correspond to an alcohol; ii) the at least one hydrogen bond acceptor can correspond to an ether, an ester, a ketone, an aldehyde, a phosphite ester, a phosphate ester, or a combination thereof; or iii) a combination of i) and ii).

Optionally, a heat transfer fluid according to any of the above aspects can be used by circulating the heat transfer fluid in a heat transfer system. Optionally, the heat transfer system can correspond to a system for circulating a lubricant.

DETAILED DESCRIPTION

Figure 1:
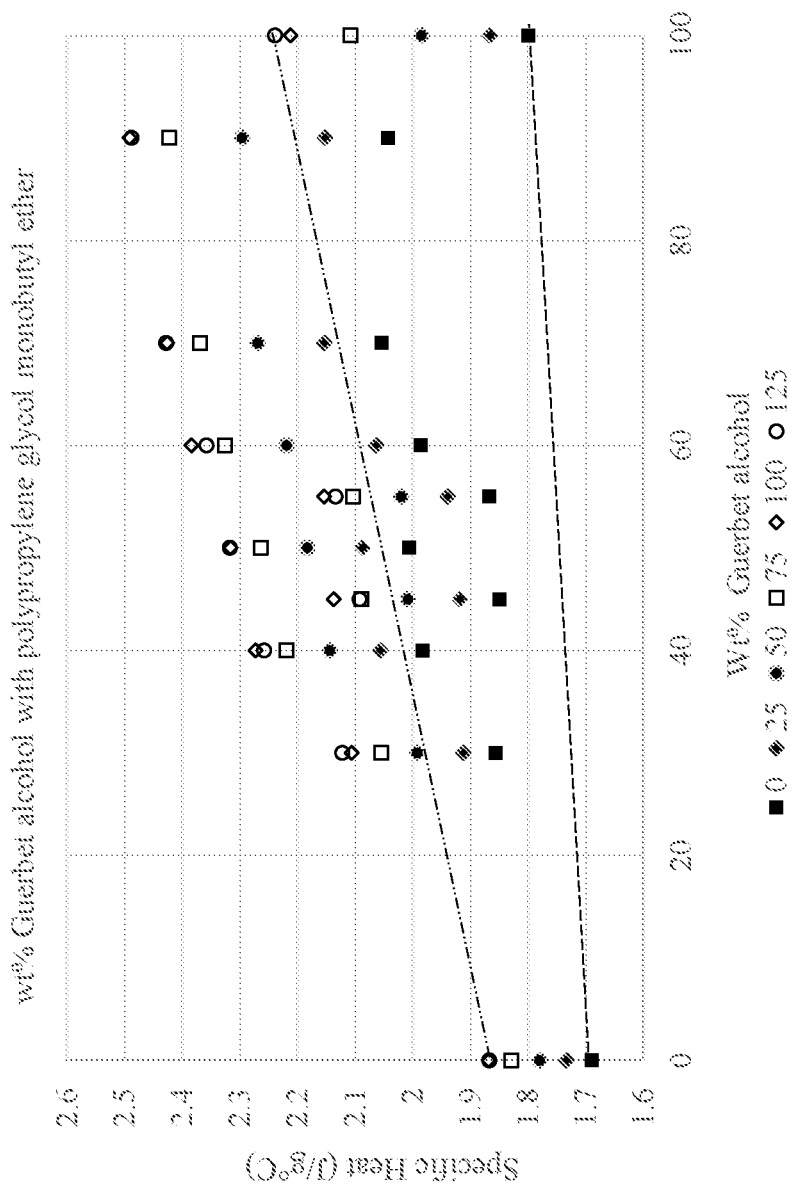
FIG. 1 shows heat capacities for various mixtures of a Guerbet alcohol with a polypropylene glycol monobutyl ether.

All numerical values within the detailed description and the claims herein are modified by "about" or "approximately" the indicated value, and take into account experimental error and variations that would be expected by a person having ordinary skill in the art.

Overview

In various aspects, heat transfer fluids corresponding to mixtures of at least one hydrogen bond donor and at least one hydrogen bond acceptor are provided. The heat transfer fluids can have an unexpectedly high heat capacity relative to the expected heat capacity based on the heat capacities of the at least one hydrogen bond donor and the at least one hydrogen bond acceptor. In some aspects, the heat transfer fluids can also have a sufficiently high electrical resistivity to be suitable for use in environments such as heat management systems in electric vehicles.

Conventionally, the heat capacities of lubricants and/or other heat transfer fluids fall within a somewhat narrow range relative to other properties, such as kinematic viscosity or thermal conductivity. This can limit the ability to tailor the properties of a fluid that is used in a thermal management environment.

It has unexpectedly been discovered that improved heat capacities can be achieved by using a heat transfer fluid corresponding to a mixture of a hydrogen bond donor and a hydrogen bond acceptor, where both the hydrogen bond donor and the hydrogen bond acceptor are organic compounds. Conventionally, the heat capacity of a mixture of organic compounds (in the absence of substantial amounts of water) would be expected to be roughly the weighted average of the fluids in the mixture. It has been discovered, however, that by using a mixture corresponding to 10 wt % or more of at least one hydrogen bond donor and 10 wt % or more of at least one hydrogen bond acceptor, a heat transfer fluid can be formed with a heat capacity that is substantially greater than the expected heat capacity based on a weighted average.

In some aspects, the unexpected improvement in heat capacity can be achieved by using a mixture where the hydrogen bond donor and/or the hydrogen bond acceptor include a sufficient amount of hydrogen bond donor functional groups or hydrogen bond acceptor functional groups. For example, in some aspects the hydrogen bond donor/acceptor functional groups can correspond to 1.0 wt % or more of the weight of the hydrogen bond donor/acceptor. Additionally or alternately, in some aspects the hydrogen bond donor functional groups in the hydrogen bond donor that are different from any hydrogen bond donor functional groups in the hydrogen bond acceptor can correspond to 1.0 wt % or more of the weight of the hydrogen bond donor. Further additionally or alternately, in some aspects the hydrogen bond acceptor functional groups in the hydrogen bond acceptor that are different from any hydrogen bond acceptor functional groups in the hydrogen bond donor can correspond to 10 wt % or more of the weight of the hydrogen bond acceptor.

Definitions

In this discussion, a hydrogen bonding functional group is defined as a functional group in an organic compound that includes one heteroatom corresponding to nitrogen, phosphorus, oxygen, and sulfur, and that satisfies the other requirements for being either a hydrogen bond donor functional group or a hydrogen bond acceptor functional group. For purposes of defining a weight of a hydrogen bonding functional group, any carbon atoms or hydrogen atoms that are covalently bonded to the heteroatoms are not included.

In this discussion, a hydrogen bond donor is defined as an organic compound that includes at least one hydrogen bonding functional group where a heteroatom in the hydrogen bonding functional group has three or less covalent bonds, with at least one covalent bond corresponding to a covalent bond with a hydrogen atom. Such a functional group is defined herein as a hydrogen bond donor functional group. For purposes of this definition, the hydrogen atom in a carboxylic acid group is defined as a covalent bond. More generally, any acidic hydrogen corresponding to a weakly acidic hydrogen (acid dissociation constant pKa of 2.0 or greater) is defined as a covalent bond. This includes, for example, any hydrogen atoms bonded to an oxygen in a phosphate ester.

In this discussion, a hydrogen bond acceptor is defined as an organic compound that includes at least one hydrogen bonding functional group where a) a heteroatom in the hydrogen bonding functional group includes three or less covalent bonds, and b) the hydrogen bonding functional group does not correspond to a hydrogen bond donor functional group. Such a functional group is defined herein as a hydrogen bond acceptor functional group. It is noted that the central phosphorus atom in a phosphate does not qualify as a hydrogen bond acceptor, since the central phosphorus atom has at least 4 covalent bonds to oxygens. However, each oxygen in such a phosphate group can correspond to either a hydrogen bond donor or a hydrogen bond acceptor.

It is noted that under the above definitions, a compound can be both a hydrogen bond donor and a hydrogen bond acceptor, but an individual hydrogen bonding functional group in a compound cannot be both a hydrogen bond donor functional group and a hydrogen bond acceptor functional group. Without being bound by any particular theory, it is believed that the synergistic heat capacity of the mixtures described herein is provided in part by using mixtures of hydrogen bond donors and hydrogen bond acceptors where different types of functional groups interact. Thus, a synergistic heat capacity benefit is not observed by mixing two types of alcohols together. Under the definitions provided herein, alcohols correspond to hydrogen bond donors, so therefore a mixture of two or more types of alcohols is a mixture of only hydrogen bond donors. A separate hydrogen bond acceptor would be needed in order to obtain an unexpected improvement in heat capacity.

Examples of hydrogen bond donor functional groups include (but are not limited to) alcohols (—OH, sometimes also referred to as a hydroxyl group), primary or secondary amines, and the oxygen that is bonded to the acidic hydrogen in a carboxylic acid. It is noted that a "diol" compound would contain two alcohol (—OH) functional groups, with each alcohol group being separately counted, while a "triol" contains three alcohol functional groups. Examples of hydrogen bond acceptor functional groups include (but are not limited to) carbonyl oxygens (C=O), oxygens that form an ether linkage (C—O—C), tertiary amines, and the oxygens in an ester. As noted above, in a phosphate ester, an oxygen without an acidic hydrogen can correspond to a hydrogen bond acceptor, while an oxygen with an acidic hydrogen can correspond to a hydrogen bond donor.

It is noted that under the above definitions, a carboxylic acid corresponds to two functional groups under this definition, since the two oxygens in a carboxylic acid are bonded to a carbon atom. It is noted that for a carboxylic acid, one oxygen corresponds to a hydrogen bond acceptor (the carbonyl group) and one oxygen corresponding to a hydrogen bond donor (the oxygen bonded to the acidic hydrogen). An ester also corresponds to two functional groups, but both of the oxygens in the ester correspond to hydrogen bond acceptors, since neither oxygen is covalently bonded to a hydrogen.

As defined herein, the weight of a functional group corresponds to the weight of the single heavy heteroatom (i.e., atom heavier than carbon) in the functional group. To further illustrate via clarifying examples, both ethers and alcohols have a weight of 16, based on the oxygen atom in the functional group. A ester or a carboxylic acid actually corresponds to two separate functional groups (each having a weight of 16) under the definitions provided herein. An amine of any type (primary, secondary, tertiary) has a weight of 14, based on the nitrogen atom. Quaternary amines have four covalent bonds, and therefore similar to the central atom of a phosphate, the central atom of a quaternary amine is excluded from being a hydrogen bond donor or hydrogen bond acceptor under the definitions provided herein.

In this discussion, heat capacities correspond to heat capacities as measured according to ASTM E1269.

In this discussion, the term "alkyl" is defined to include straight-chain or branched alkyl groups, such as, methyl, ethyl, n-propyl, i-propyl or the different butyl, pentyl or hexyl isomers.

In this discussion, the term "alkenyl" is defined to include straight-chain or branched alkene groups such as ethenyl, 1-propenyl, 2-propenyl, and the different butenyl, pentenyl and hexenyl isomers.

In this discussion, the term "alkylcarbonyl" is defined as one or more straight-chain or branched alkyl moieties bonded to a C(=O) moiety. Examples of "alkylcarbonyl" include $CH_3C(=O)—$, $CH_3CH_2CH_2C(=O)—$ and $(CH_3)_2CHC(=O)—$. For other types of carbonyl groups, examples of "alkoxycarbonyl" include $CH_3OC(=O)—$, $CH_3CH_2CH_2OC(=O)—$, $(CH_3)_2CHOC(=O)—$, $CH_3CH_2CH_2C(=O)O—$ and the different butoxy- or pentoxycarbonyl isomers. Examples of "alkylaminocarbonyl" include $(CH_3)NHC(=O)—$. Examples of "dialkylaminocarbonyl" include $(CH_3)_2NC(=O)—$. Examples of "alkoxycarbonylalkyl" include $CH_3C(=O)CH_2—$.

Mixtures with Synergistic Heat Capacity Increase

In various aspects, a mixture can be formed using at least one hydrogen bond donor and at least one hydrogen bond acceptor that provides an unexpectedly high heat capacity relative to the expected heat capacity based on the weighted average of the components in the mixture. Due to the synergy of the components in the mixture (i.e., the at least one hydrogen bond donor and the at least one hydrogen bond acceptor), the heat capacity can be 3.0% or more higher than the expected value based on a weighted average, or 5.0% or more higher, or 8.0% or more higher, or 10% or more higher, such as up to 50% higher than the expected value (or possibly still higher). In some aspects, this synergistic benefit may be observed at one or more temperatures between −50° C. and 150° C., or 0° C. and 150° C., or 0° C. and 120° C.

In various aspects, the mixture can include 10 wt % or more of the at least one hydrogen bond donor, and 10 wt % or more of the at least one hydrogen bond acceptor. In some aspects, the mixture can include 10 wt % or more of a first hydrogen bond donor, and optionally can include one or more additional hydrogen bond donors. In some aspects, the mixture can include 10 wt % or more of a first hydrogen bond acceptor, and optionally can include one or more additional hydrogen bond acceptors. It is noted that other components can also be present in the mixture in addition to hydrogen bond donor(s) and hydrogen bond acceptor(s). In various aspects, the combined weight of the at least one hydrogen bond donor and the at least one hydrogen bond acceptor can correspond to 20 wt % or more of the weight of the mixture, or 40 wt % or more, or 60 wt % or more, or 80 wt % or more, such as having substantially all (i.e., up to 100 wt %) of the mixture correspond to hydrogen bond donor(s) and hydrogen bond acceptor(s). Additionally or alternately, in some aspects the combined weight of the first hydrogen bond donor and the first hydrogen bond acceptor can correspond to 20 wt % or more of the weight of the mixture, or 40 wt % or more, or 60 wt % or more, or 80 wt % or more, such as having substantially all (i.e., up to 100 wt %) of the mixture correspond to the first hydrogen bond donor and the first hydrogen bond acceptor.

The mixture of the at least one hydrogen bond donor and the at least one hydrogen bond acceptor can also have other desirable properties for use in a variety of environments. In various aspects, the at least one hydrogen bond donor and the at least one hydrogen bond acceptor can be compounds that are liquids at −30° C. and a pressure of 100 kPa-a, or at −40° C. and a pressure of 100 kPa-a, or at −50° C. and a pressure of 100 kPa-a. For example, the individual components corresponding to the at least one hydrogen bond donor and the at least one hydrogen bond acceptor can have a melting point of lower than −30° C., or lower than −40° C., or lower than −50° C., such as down to −200° C. or possibly still lower. This is in contrast to mixtures such as deep eutectic solvent (DES) mixtures, where one or both of the components in a deep eutectic solvent can be a solid at 0° C. In some aspects, the at least one hydrogen bond donor and the at least one hydrogen bond acceptor can be liquids (at a pressure of 100 kPa-a) in at least the range between −30° C. and 150° C., or between −40° C. and 150° C., or between −50° C. and 150° C. In other aspects, the hydrogen bond donor and/or the hydrogen bond acceptor may have a boiling point of less than 150° C., or less than 120° C.

Additionally or alternately, in some aspects the electrical conductivity of the mixture can be 2.0 µS/cm or less, or 1.0 µS/cm or less, or 0.1 µS/cm or less, such as down to 0.001 µS/cm or less or possibly still lower. In order to achieve a desired reduced level of electrical conductivity, the mixture can be substantially free of added water. It is noted that this does not require use of anhydrous reagents when forming the mixture, as trace amounts of water can be included. In some aspects, the water content of the mixture can be 0.1 wt % or less, such as down to substantially 0 wt % water (according to the detection limit of a suitable measurement).

In various aspects, the hydrogen bonding functional groups that provide the hydrogen bond donor and/or hydrogen bond acceptor properties for a compound can correspond to a substantial portion of the compound. In such aspects, the weight of the hydrogen bond donor functional groups can correspond to 1.0 wt % or more of the molecular weight of a hydrogen bond donor, or 5.0 wt % or more, or 10 wt % or more, such as up to 50 wt % or possibly still higher. In such aspects, the weight of the hydrogen bond acceptor functional groups can correspond to 1.0 wt % or more of the molecular weight of a hydrogen bond acceptor, or 5.0 wt % or more, or 10 wt % or more, such as up to 50 wt % or possibly still higher. This allows the hydrogen bond donor functional group(s) or hydrogen bond acceptor functional group(s) to be present in the compound in sufficient quantity to provide a synergistic increase in the heat capacity of a mixture.

In some aspects, a compound can have a sufficient number of hydrogen bonding functional groups to serve as both a hydrogen bond donor and a hydrogen bond acceptor. It is noted, however, that by definition, a single compound cannot be used to form a mixture. Similarly, a single compound cannot have an unexpected synergy in heat capacity by mixing it with itself.

In addition to having a sufficient number of acceptor and/or donor groups, the commonality in acceptor functional groups between the hydrogen bond donor and the hydrogen bond acceptor in a mixture can also be a factor in achieving an unexpected heat capacity increase when mixing heat transfer fluids. In various aspects, the hydrogen bond acceptor functional groups in the hydrogen bond acceptor that are different from any hydrogen bond acceptor functional groups in the hydrogen bond donor can correspond to 10 wt % or more of the weight of the hydrogen bond acceptor, or 20 wt % or more, or 40 wt % or more, such as up to having substantially all of the hydrogen bond acceptor functional groups in the hydrogen bond acceptor being different from hydrogen bond acceptor functional groups in the hydrogen bond donor. Without being bound by any particular theory, it is noted that some compounds that qualify as hydrogen bond donors can include a substantial portion of hydrogen bond acceptor functional groups. When substantially all of the functional groups corresponding to hydrogen bond acceptor functional groups are present in both compounds, the opportunity for synergistic heat capacity increase is reduced, minimized, or eliminated, due to the fact that any heat capacity benefit from a mix of acceptor and donor functional groups will already be achieved by the hydrogen bond donor.

For example, a long chain polyether or long chain polyalkylene glycol, such as polytetrahydrofuran or polyethylene glycol, can include a large plurality of ether functional groups. Such a compound can be terminated either as an ether or with another type of functional group, such as an alcohol. When a long chain polyether or polyalkylene glycol is terminated as an alcohol, the terminal hydroxyl group corresponds to a hydrogen donor. If the chain is sufficiently short, the oxygen in the terminal hydroxyl group can correspond to more than 1.0 wt % of the molecular weight of the compound, so that the polyether corresponds to a hydrogen donor. However, mixtures of different types of hydroxy-terminated polyethers and/or hydroxy-terminated polyalkylene glycols do not provide a synergistic increase in heat capacity. This is due to the fact that the only hydrogen bond acceptor functional groups present in a mixture of polyethers and/or polyalkylene glycols are the ether oxygens. Thus, any heat capacity benefit from having hydroxyl groups terminating the polyethers/polyalkylene glycols is already realized by the individual polyether/polyalkylene glycol components. To achieve a synergistic increase in heat capacity, a different type of hydrogen bond acceptor group is needed, such as the carbonyl oxygens present in an ester or ketone group. Thus, a mixture of octyl octanoate and a hydroxyl-terminated polyester can provide a synergistic benefit, as roughly half of the hydrogen bond acceptor groups in octyl octanoate are carbonyl oxygens rather than ether oxygens. Since a hydroxyl-terminated polyester does not include carbonyl groups, a substantial portion of the hydrogen bond acceptor functional groups in octyl octanoate are different from the functional groups in the polyester, and therefore a synergistic heat capacity benefit can be realized.

As still another example, a long chain polypropylene glycol molecule includes a large plurality of oxygen atoms corresponding to ether groups. At the ends of the polypropylene glycol molecule, the molecule can either be terminated as an ether or as an alcohol. Based on the large plurality of oxygen atoms corresponding to ether groups, polypropylene glycol corresponds to a hydrogen bond acceptor. If one or both ends of the polypropylene glycol are terminated as an alcohol, the polypropylene glycol can potentially also correspond to a hydrogen bond donor. However, if the weight of the oxygen(s) in the terminal alcohol group(s) is less than 1.0 wt % of the weight of the polypropylene glycol molecule, in some optional aspects the polypropylene glycol can be outside of the definition of a hydrogen bond donor.

In some aspects, the mixture can correspond to a fluid that is primarily used as a heat transfer fluid, such as use as a coolant in a thermal management system. In other aspects, the mixture can correspond to a fluid that performs multiple functions, such as a fluid that serves as both a lubricant and as a heat transfer fluid.

Generally, the compounds corresponding to the at least one hydrogen bond donor and the at least one hydrogen bond acceptor can have a high enough molecular weight to not be gases at −50° C. This can correspond to having a molecular weight of 62 g/mol or more, or 77 g/mol or more, or 88 g/mol or more, or 100 g/mol or more. Although there is not a strict upper limit to molecular weight for the hydrogen bond donor or the hydrogen bond acceptor, as a practical matter a sufficiently high molecular weight will result in a compound that is a solid for at least part of the temperature range from −50° C. to 150° C. Thus, the molecular weight of a hydrogen bond donor or a hydrogen bond acceptor can typically be less than 2500 g/mol.

In some aspects, a hydrogen bond donor and/or a hydrogen bond acceptor can have a boiling point of 50° C. or more but less than 150° C., or less than 120° C. 1-pentanol is an example of a potential hydrogen bond donor that has a boiling point of less than 120° C. In other aspects, a higher boiling mixture may be desirable. For example, for a mixture that will be used as both a lubricant and a heat transfer fluid, it may be desirable for the compounds in the mixture to have boiling points in or near the lubricant boiling range. In such aspects, the at least one hydrogen bond donor and/or the at least one hydrogen bond acceptor can have a boiling point of 120° C. or more, or 150° C. or more, or 250° C. or more, or 300° C. or more, such as up to 565° C. or possibly still higher. Boiling point can be determined, for example, using ASTM-D1120.

The mixture of at least one hydrogen bond donor and at least one hydrogen bond acceptor can be used as a heat transfer fluid, or the mixture can be combined with one or more other components to form a heat transfer fluid. The mixture and/or the heat transfer fluid formed by adding components to the mixture can also have one or more of the following additional properties. The additional properties can include a freezing point of −50° C. or more, or −40° C. or more as determined by ASTM D1777-17; a kinematic viscosity at 100° C. ($KV_{100}$) from 0.5 to 5.0 and/or a kinematic viscosity at 40° C. ($KV_{40}$) of 1.0 to 50, as determined by ASTM D-445; and/or a flash point of 95° C. or more, or 125° C. or more or 150° C. or more, or 200° C. or more, as determined by ASTM D92.

The mixture or a heat transfer fluid formed using the mixture can be used in a heat transfer process. The heat transfer process can be carried out at a temperature from −40° C. to 150° C., or −40° C. to 120° C. and/or a pressure from 0.1 MPa-g to 500 MPa-a. For example, the heat transfer fluid can be circulated in a heat transfer system, such as a system for circulating a lubricant or a coolant within an electric vehicle environment or other engine environment.

Examples of Structures Corresponding to Hydrogen Bond Donors and Hydrogen Bond Acceptors A variety of organic compounds can correspond to hydrogen bond donors and/or hydrogen bond acceptors under the definitions provided herein. The following are examples of general structures that can correspond to at least one of a hydrogen bond donor and a hydrogen bond acceptor.

Structure 1

(1)

Structure 1 corresponds to an alcohol. In Structure 1, A is H, COOH, $C_1$-$C_{36}$ alkyl, $C_2$-$C_{36}$ alkenyl, $C_1$-$C_{36}$ alkoxylcarbonyl, $C_1$-$C_{36}$ alkylaminocarbonyl, $C_1$-$C_{36}$ dialkylaminocarbonyl, $C_1$-$C_{36}$ oxycarbonylalkyl, $C_1$-$C_{36}$ alkoxycarbonylalkyl, $C_1$-$C_{36}$, alkylaminocarbonylalkyl, or $C_1$-$C_3$ dialkylaminocarbonylalkyl; B is H, $C_1$-$C_{36}$ alkyl, or $C_2$-$C_{36}$ alkenyl.

The —OH that is explicitly shown in Structure 1 is a hydrogen bond donor functional group, so compounds (alcohols) based on Structure 1 correspond to hydrogen bond donors. Examples of alcohols include Guerbet alcohols; various blends of alcohols (such as Exxal™ alcohols); dodecanol; 2-hydroxyoctadecanoic acid, and methyl 12-hydroxystearate.

It is noted that Structure 1 can also correspond to a hydrogen bond acceptor if A in Structure 1 includes a carbonyl or ether. More generally, in the Structures described below, the side groups selected for a particular compound may allow the compound to be a hydrogen bond donor and/or a hydrogen bond acceptor.

Structures 2 and 3

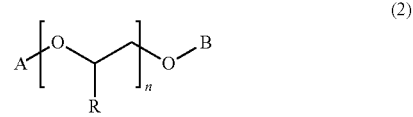
(2)

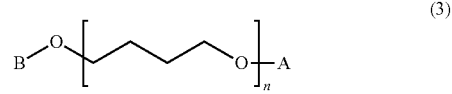
(3)

Structure 2 and Structure 3 can correspond to a polyol, an ether alcohol, or a polyether. In aspects where Structure 2 or Structure 3 is a polyether, the polyether can optionally be alcohol terminated. In Structure 2 or Structure 3, A and B are each independently H, $C_1$-$C_{24}$ alkyl, $C_2$-$C_{24}$ alkenyl, $C_1$-$C_{24}$ alkylcarbonyl, or $C_1$-$C_{24}$ alkenylcarbonyl; and n is an integer from 1-12. Additionally, in Structure 2, R is H, $C_1$-$C_{24}$ alkyl, or $C_2$-$C_{24}$ alkenyl.

One example of a compound according to Structure 2 is a compound where B is C16-C20 alkyl, A is $CH_3$, and R is selected as described above. Other examples of compounds according to Structure 2 include Arlamole® E (polyoxypropylene 15 stearyl ether), ethylene glycol, propylene glycol, and polypropylene glycol, such as a mixture of polypropylene glycols with an average molecular weight between 300 and 400 g/mol. An example of Structure 3 is polytetrahydrofuran, such as a mixture of polytetrahydrofurans with an average molecular weight between 500 g/mol and 750 g/mol.

Structure 2 or Structure 3 corresponds to a hydrogen bond donor when A and/or B is H. Structure 2 or Structure 3 is a hydrogen bond acceptor when A or B is not H, or when n is 2 or greater.

Structures 4, 5, and 6

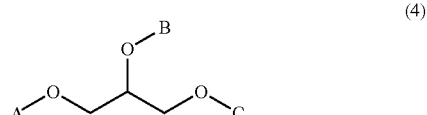
(4)

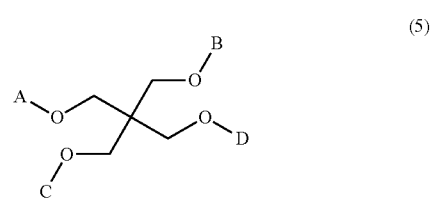
(5)

-continued

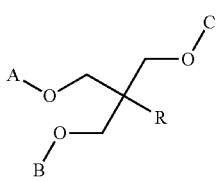
(6)

Structures 4, 5, and 6 can correspond to a polyol, an ether alcohol, or a polyether. A, B, and C in Structures 4, 5, and 6 (and D in Structure 5) are each independently H, $C_1$-$C_{24}$ alkyl, $C_2$-$C_{24}$ alkenyl, $C_1$-$C_{24}$ alkylcarbonyl, or $C_1$-$C_{24}$ alkenylcarbonyl. In Structure 6, R can be methyl, ethyl, or propyl.

In some aspects, A in Structure 4 can correspond to $C_{14}$-$C_{20}$ alkylcarbonyl or $C_{14}$-$C_{20}$ alkenylcarbonyl. An example of a compound according to Structure 4 is glycerol mono-oleate.

In some aspects, A, B, and/or C in Structure 5 can correspond to $C_{14}$-$C_{20}$ alkylcarbonyl or $C_{14}$-$C_{20}$ alkenylcarbonyl while D is H. In some preferred aspects, A, B, and C in Structure 5 can correspond to $C_{14}$-$C_{20}$ alkylcarbonyl or $C_{14}$-$C_{20}$ alkenylcarbonyl, while D is H, $C_{14}$-$C_{20}$ alkylcarbonyl, or $C_{14}$-$C_{20}$ alkenylcarbonyl.

In some aspects, A and B in Structure 6 can correspond to $C_{14}$-$C_{20}$ alkylcarbonyl or $C_{14}$-$C_{20}$ alkenylcarbonyl, C can be H, and R can be methyl or ethyl. In some aspects, A, B, and C in Structure 6 can correspond to $C_{14}$-$C_{20}$ alkylcarbonyl or $C_{14}$-$C_{20}$ alkenylcarbonyl, Structures 4, 5, and 6 can be a hydrogen bond donor when at least one of A, B, or C (or D in Structure 5) is H. Structures 4, 5, and 6 can be a hydrogen bond acceptor when at least one of A, B, or C (or D in Structure 5) is not H. An example of a compound according to Structure 6 are the esters in Esterex NP 343, available from ExxonMobil Corporation.

Structure 7

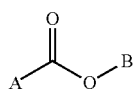
(7)

Structure 7 can correspond to an ester or a carboxylic acid. In Structure 7, A is H, $C_1$-$C_{36}$ alkyl, $C_2$-$C_{36}$ alkenyl, or $C_1$-$C_{36}$ alkoxylcarbonyl; and B is H, $C_1$-$C_{36}$ alkyl, or $C_2$-$C_{36}$ alkenyl. Examples of compounds corresponding to Structure 7 include octyl octanoate, steric acid, and oleic acid. Structure 7 is a hydrogen bond acceptor. Structure 7 can also be a hydrogen bond donor when B=H.

Structure 8

(8)

Structure 8 can correspond to an aldehyde or an amide. In Structure 8, A is C1-C36 alkyl or C2-C36 alkenyl; and B is amino, $C_1$-$C_8$ alkylamino, or $C_1$-$C_8$ dialkylamino. Examples of compounds according to Structure 8 include compounds where A is $C_{14}$-$C_{20}$ alkyl or $C_{14}$-$C_{20}$ alkenyl and B is H.

Structure 8 is a hydrogen bond acceptor based on the carbonyl group. Structure can be a hydrogen bond donor when B=amino or $C_1$-$C_8$ alkylamino.

Structure 9

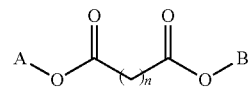
(9)

In Structure 9, n can be 1-12 while A and B are each independently H, $C_1$-$C_{24}$ alkyl, $C_2$-$C_{24}$ alkenyl, $C_1$-$C_{24}$ alkylcarbonyl, $C_1$-$C_{24}$ alkenylcarbonyl.

Structures 10 and 11

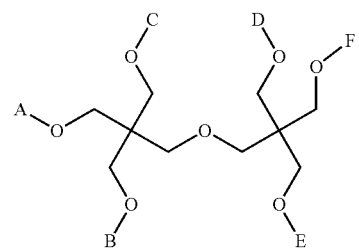
(10)

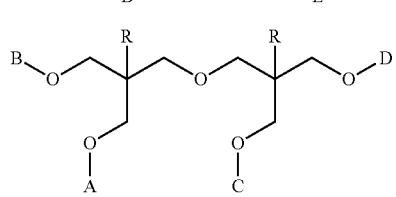
(11)

In Structure 10 and Structure 11, A, B, C, D, E and F are each independently H, $C_1$-$C_{24}$ alkyl, $C_2$-$C_{24}$ alkenyl, $C_1$-$C_{24}$ alkylcarbonyl, or $C_1$-$C_{24}$ alkenylcarbonyl. It is noted that E and F are only present in Structure 10. Some examples of compounds according to Structure 10 can correspond to A, B, C, D, and E as $C_{14}$-$C_{20}$ alkylcarbonyl or $C_{14}$-$C_{20}$ alkenylcarbonyl while F is H or $C_{14}$-$C_{20}$ alkylcarbonyl or $C_{14}$-$C_{20}$ alkenylcarbonyl. Some examples of compounds according to Structure 11 can correspond to A, B, and C as $C_{14}$-$C_{20}$ alkylcarbonyl or $C_{14}$-$C_{20}$ alkenylcarbonyl while D is H or $C_{14}$-$C_{20}$ alkylcarbonyl or $C_{14}$-$C_{20}$ alkenylcarbonyl. Structures 10 or 11 can correspond to a hydrogen bond donor when at least one of A, B, C, D, E, or F is H. Structures 10 or 11 can correspond to a hydrogen bond acceptor when at least one of A, B, C, D, E, or F is not H.

Structure 12

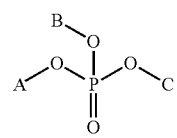
(12)

Structure 12 corresponds to phosphate esters. In Structure 12, A, B, and C are each independently H, $C_1$-$C_{24}$ alkyl, $C_2$-$C_{24}$ alkenyl, or a phenyl ring or a naphthalenyl ring system. When one or more of A, B, and C are a ring or ring system, each ring or ring system can be optionally substituted with up to 5 substituents independently selected from R, where R=$C_1$-$C_{12}$ alkyl or $C_1$-$C_{12}$ alkoxy. Examples of compounds according to Structure 12 include tricresyl phosphate or tributyl phosphate.

Structure 12 is a hydrogen bond acceptor. Structure 12 can also be a hydrogen bond donor in aspects where one or two of A, B, and C are H. It is noted that if all three of A, B, and C are H, the resulting compound would be phosphoric acid, which is not an organic compound and therefore is not a hydrogen bond donor or hydrogen bond acceptor under the definitions used herein.

Structure 13

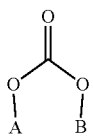

(13)

In Structure 13, A and B can each independently be $C_1$-$C_{24}$ alkyl or $C_2$-$C_{24}$ alkenyl, or A and B can be taken together to form a ring structure. In aspects where a ring structure is formed, A and B together can correspond to a $C_2$-$C_6$ alkyl group that forms a ring that incorporates two of the oxygens and the carbon that are explicitly shown in Structure 13. It is noted that a portion of such a $C_2$-$C_6$ alkyl group may be used to form a side chain off of the ring. Examples of compounds according to Structure 13 include propylene carbonate and bis(2-ethylhexyl) carbonate. Structure 13 is a hydrogen bond acceptor.

Structure 14

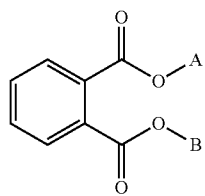

(14)

In Structure 14, A and B are each independently $C_1$-$C_{24}$ alkyl or $C_2$-$C_{24}$ alkenyl. Examples of compounds according to Structure 14 include diisodecyl phthalate (DIDP) or diisononyl phthalate (DINP).

Structure 15

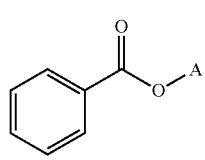

(15)

In Structure 15, A is $C_1$-$C_{36}$ alkyl or $C_2$-$C_{36}$ alkenyl. An example of a compound according to Structure 15 is 2-ethylhexyl benzoate.

Structure 16

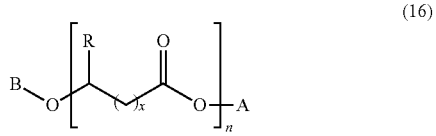

(16)

Structure 16 corresponds to an estolide. In Structure 16, A is $C_1$-$C_{20}$ alkyl, R is $C_1$-$C_{20}$ alkyl, B is $C_1$-$C_{12}$ alkyl or $C_1$-$C_{12}$ alkylcarbonyl, n is an integer from 2-6, and x is an integer from 3-12.

Lubricant Base Stocks as Blend Components for a Heat Transfer Fluid Composition

Lubricant base stocks and/or formulated lubricating oils are examples of potential blend component(s) for blending with a mixture of hydrogen bond donor and hydrogen bond acceptor to form a heat transfer fluid. In such an example, blending one or more lubricant base stocks with the mixture can result in a fluid that serves as both a lubricant and as a heat transfer fluid.

In some aspects, the weight ratio of one or more lubricant base stocks to the hydrogen bond donor(s) in the composition can range from 1:25 to 25:1. In some aspects, the weight ratio of one or more lubricant base stocks to the hydrogen bond acceptor(s) in the composition can range from 1:25 to 25:1. In some aspects, the weight ratio of one or more lubricant base stocks to a combined weight of the hydrogen bond donor(s) and the hydrogen bond acceptor(s) in the composition can range from 1:25 to 25:1. Additionally or alternately, the amount of one or more lubricant base stocks in the composition can be 1.0 vol % to 80 vol %, or 1.0 vol % to 40 vol %, or 1.0 vol % to 10 vol %, or 20 vol % to 80 vol %, or 20 vol % to 40 vol %, or 40 vol % to 80 vol %.

The one or more lubricant base stocks and/or lubricating oils can have various properties that are typical of lubricant base stocks. For example, a lubricant base stock can have one or more of the following properties: a kinematic viscosity at 100° C. of 0.5 cSt to 40 cSt, or 2.0 cSt to 35 cSt, or 0.5 cSt to 25 cSt, or 2.0 cSt to 25 cSt; a kinematic viscosity at 40° C. of 1.0 cSt or more, or 4.0 cSt or more, such as up to 100 cSt or possibly still higher; a viscosity index of 75 to 300, or 75 to 200; a density at 15.6° C. of 0.85 to 0.88 g/cm³; a T5 distillation point of 350° C. or more, or 400° C. or more; and/or a T95 distillation point of 425° C. to 575° C., or 425° C. to 550° C. Additionally or alternately, at least 50 vol % of the base stock can have a distillation point of 380° C. or more, or 400° C. or more. It is noted that viscosity index is not well defined for kinematic viscosity values below 2.0 cSt. For lubricant base stocks and/or lubricant oils with a kinematic viscosity below 2.0 cSt, the Walther equation can be used. In such aspects, if it is desired to characterize the change in kinematic viscosity with temperature, the slope determined from the Walther equation can be greater than −5.0.

In aspects where a lubricating oil is used as a blend component, the lubricating oil can optionally include one or more additives. Such additives can include, but are not limited to, antiwear additives, detergents, dispersants, viscosity modifiers, corrosion inhibitors, rust inhibitors, metal deactivators, extreme pressure additives, anti-seizure agents, wax modifiers, other viscosity modifiers, fluid-loss additives, seal compatibility agents, lubricity agents, anti-staining agents, chromophoric agents, defoamants, demulsifiers, emulsifiers, densifiers, wetting agents, gelling agents, tackiness agents, colorants, and others. For a review of many commonly used additives, see "Lubricant Additives, Chemistry and Applications", Ed. L. R. Rudnick, Marcel Dekker, Inc. 270 Madison Ave. New York, N.J. 10016, 2003, and Klamann in Lubricants and Related Products, Verlag Chemie, Deerfield Beach, FL; ISBN 0-89573-177-0. Reference is also made to "Lubricant Additives" by M. W. Ranney, published by Noyes Data Corporation of Parkridge, N J (1973); see also U.S. Pat. No. 7,704,930, the disclosure of which is incorporated herein in its entirety. These additives are commonly delivered with varying amounts of diluent oil that may range from 5 weight percent to 50 weight percent.

The additives useful in this disclosure do not have to be soluble in the lubricating oils. For example, insoluble additives such as zinc stearate in oil can be dispersed in the lubricating oils of this disclosure.

When lubricating oil compositions contain one or more additives, the additive(s) are blended into the composition in an amount sufficient for it to perform its intended function. Additives are typically present in lubricating oil compositions as a minor component, typically in an amount of less than 50 weight percent, preferably less than 30 weight percent, and more preferably less than 15 weight percent, based on the total weight of the composition. Additives are most often added to lubricating oil compositions in an amount of at least 0.1 weight percent, preferably at least 1 weight percent, more preferably at least 5 weight percent. Typical amounts of such additives useful in the present disclosure are shown in Table 1 below.

It is noted that many of the additives are shipped from the additive manufacturer as a concentrate, containing one or more additives together, with a certain amount of base oil diluents. Accordingly, the weight amounts in the Table 1 below, as well as other amounts mentioned herein, are directed to the amount of active ingredient (that is the non-diluent portion of the ingredient). The weight percent (wt %) indicated below is based on the total weight of the lubricating oil composition.

TABLE 1

Typical Amounts of Other Lubricating Oil Components

| Compound | Approximate wt % (Useful) | Approximate wt % (Preferred) |
| --- | --- | --- |
| Dispersant | 0.1-20 | 0.1-8 |
| Detergent | 0.1-20 | 0.1-8 |
| Friction Modifier | 0.01-5 | 0.01-1.5 |
| Antioxidant | 0.1-5 | 0.1-1.5 |
| Pour Point Depressant (PPD) | 0.0-5 | 0.01-1.5 |
| Anti-foam Agent | 0.001-3 | 0.001-0.15 |
| Viscosity Modifier (solid polymer basis) | 0.1-2 | 0.1-1 |
| Antiwear | 0.2-3 | 0.5-1 |
| Inhibitor and Antirust | 0.01-5 | 0.01-1.5 |

The foregoing additives are all commercially available materials. These additives may be added independently but are usually precombined in packages which can be obtained from suppliers of lubricant oil additives. Additive packages with a variety of ingredients, proportions and characteristics are available and selection of the appropriate package will take the requisite use of the ultimate composition into account.

The lube base stocks of the present disclosure are well suited as lube base stocks without blending limitations, and further, the lube base stock products are also compatible with lubricant additives for lubricant formulations. The lube base stocks of the present disclosure can optionally be blended with other lube base stocks to form lubricants. Useful cobase lube stocks include Group I, III, IV and V base stocks and gas-to-liquid (GTL) oils. One or more of the cobase stocks may be blended into a lubricant composition including the lube base stock at from 0.1 to 50 wt. %, or 0.5 to 40 wt. %, 1 to 35 wt. %, or 2 to 30 wt. %, or 5 to 25 wt. %, or 10 to 20 wt. %, based on the total lubricant composition.

Example 1—Synergistic Heat Capacity Benefit for Mixture of Alcohol and Ether

A series of mixtures of a Guerbet alcohol and a hydroxyl terminated polyalkylene glycol were produced and characterized. A Guerbet alcohol corresponds to a β-alkylated primary alcohol, and therefore is a hydrogen bond donor. The Guerbet alcohol used in this example was a blend of methyl-branched Guerbet alcohols with an average number of carbons per alcohol molecule that roughly corresponds to a $C_{25}$ alcohol. It is noted that the Guerbet alcohol does not include hydrogen bond acceptor groups. The polyalkylene glycol corresponded to poly(propylene glycol) monobutyl ether. The polypropylene glycol is a hydrogen bond acceptor based on the multiple ether linkages in the polypropylene glycol. It is noted that one end of the polypropylene glycol is terminated by an ether, while the other end is terminated by an alcohol. Thus, if paired with a different component in a different mixture, the polypropylene glycol could potentially serve as a hydrogen bond donor. However, since the Guerbet alcohol includes only hydrogen bond donor functional groups, the polypropylene glycol is the hydrogen bond acceptor in this mixture.

Mixtures of the Guerbet alcohol and the polypropylene glycol were formed at various weight mixtures ranging from as low as 30 wt % of the alcohol to up to 90 wt % alcohol in the mixture. The heat capacity of the mixtures was then obtained at various temperatures between 0° C. and 125° C. according to ASTM E1269. The heat capacities of the Guerbet alcohol and the polypropylene glycol alone were also obtained at the various temperatures.

FIG. 1 shows the results from the characterization of the heat capacities for the various mixtures. Two trend lines are also shown in FIG. 1. The lower trend line in FIG. 1 shows what the weighted average of the heat capacity would be for mixtures of the Guerbet alcohol and the polypropylene glycol at 0° C. The upper trend line in FIG. 1 shows what the weighted average of the heat capacity would be for mixtures of the Guerbet alcohol and the polypropylene glycol at 125° C.

As shown in FIG. 1, the mixtures of Guerbet alcohol and propylene glycol provided an unexpected increase in heat capacity relative to the calculated heat capacity based on the weighted average of the heat capacities of the components in the mixture. To further illustrate the benefit, Table 2 shows the percentage increase in heat capacity relative to the weighted average value for each of the data points shown in FIG. 1.

TABLE 2

Percentage Increase in Measured Heat Capacity Versus Expected (Weighted Average Calculation) Heat Capacity

| Wt % Guerbet Alcohol | 0° C. | 25° C. | 50° C. | 75° C. | 100° C. | 125° C. |
| --- | --- | --- | --- | --- | --- | --- |
| 0 | 0 | 0 | 0 | 0 | 0 | 0 |
| 30 | 7.8 | 7.8 | 8.2 | 7.4 | 6.8 | 7.2 |

TABLE 2-continued

Percentage Increase in Measured Heat Capacity Versus
Expected (Weighted Average Calculation) Heat Capacity

| Wt % Guerbet Alcohol | 0° C. | 25° C. | 50° C. | 75° C. | 100° C. | 125° C. |
|---|---|---|---|---|---|---|
| 40 | 14.4 | 15.1 | 15.1 | 14.3 | 13.3 | 12.0 |
| 45 | 6.4 | 7.0 | 7.3 | 6.9 | 5.6 | 2.8 |
| 50 | 15.0 | 16.0 | 16.0 | 15.0 | 13.5 | 12.9 |
| 55 | 6.7 | 7.4 | 6.7 | 6.1 | 4.7 | 3.0 |
| 60 | 13.2 | 13.8 | 16.6 | 16.5 | 14.9 | 12.8 |
| 70 | 16.3 | 17.9 | 18.0 | 17.0 | 15.0 | 14.1 |
| 90 | 14.3 | 16.2 | 16.9 | 16.5 | 14.4 | 13.0 |
| 100 | 0 | 0 | 0 | 0 | 0 | 0 |

As shown in Table 2, the data is somewhat noisy, but the general trend is clear. Mixtures of a hydrogen bond donor (Guerbet alcohol) with a hydrogen bond acceptor (polypropylene glycol) provide an unexpected increase in heat capacity relative to the value that would be expected based on a weighted average of the components. This unexpected increase in heat capacity corresponds to roughly 10% to 15% of the expected heat capacity value.

It is noted that the synergy may be reduced as the temperature increases, based on the data in Table 2. Similarly, based on the results in this and the other Examples, it is expected that the synergistic increase in heat capacity will increase as temperature is reduced to values below 0° C. Thus, it is believed that the synergistic increase in heat capacity described herein can be observed down to temperatures of −50° C. or possibly still lower.

Example 2—Synergistic Heat Capacity Benefit for Mixture of Ethylene Glycol with Propylene Carbonate A series of mixtures of ethylene glycol and propylene carbonate were produced and characterized. The mixtures of the ethylene glycol and the propylene carbonate were formed at 25 wt %, 50 wt %, and 75 wt % of ethylene glycol in the mixture. The heat capacity of the mixtures was then obtained at various temperatures between 20° C. and 90° C. according to ASTM E1269. The heat capacities of the ethylene glycol and the propylene carbonate alone were also obtained at the various temperatures. Table 3 shows the results from the heat capacity measurements.

TABLE 3

Percentage Difference Between Weighted Average of
Heat Capacity and Measured Heat Capacity for Mixtures
of Ethylene Glycol and Propylene Carbonate

| Wt % Ethylene Glycol | 20° C. | 35° C. | 50° C. | 65° C. | 80° C. | 90° C. |
|---|---|---|---|---|---|---|
| 0 | 0 | 0 | 0 | 0 | 0 | 0 |
| 25 | 17.6 | 12.2 | 10.8 | 9.8 | 9.0 | 8.5 |
| 50 | 9.6 | 7.8 | 7.3 | 7.0 | 7.4 | 5.9 |
| 75 | 8.0 | 7.5 | 7.1 | 6.8 | 6.6 | 6.4 |
| 100 | 0 | 0 | 0 | 0 | 0 | 0 |

As shown in Table 3, mixtures of ethylene glycol (alcohol, hydrogen bond donor) and propylene carbonate (cyclic ester, hydrogen bond acceptor) provide an unexpected increase in heat capacity relative to the expected heat capacity value based on a weighted average. Similar to the data in Table 2, there may be a decrease in the synergistic benefit at higher temperatures.

Example 3—Mixture of Octyl Octanoate and PolyTHF

Mixtures of 75 wt % octyl octanoate and 25 wt % polytetrahydrofuran were produced and characterized. Octyl octanoate is an ester, and therefore corresponds to a hydrogen bond acceptor. The polytetrahydrofuran corresponded to both a hydrogen bond acceptor and a hydrogen bond donor. The polytetrahydrofuran is a hydrogen bond acceptor based on the ether linkages in the compound. The polytetrahydrofuran was also hydroxy-terminated, and had an average molecular weight of 650 g/mol. The hydroxy-termination corresponds to roughly 2.5 wt % of the weight of the compound, which is greater than 1.0 wt % of the molecular weight. Therefore, the polytetrahydrofuran also corresponded to a hydrogen-bond donor under the definitions provided herein. The heat capacities of the octyl octanoate and the polytetrahydrofuran were also separately characterized. The heat capacities were measured at 20° C., 80° C., and 120° C.

Figure 2:
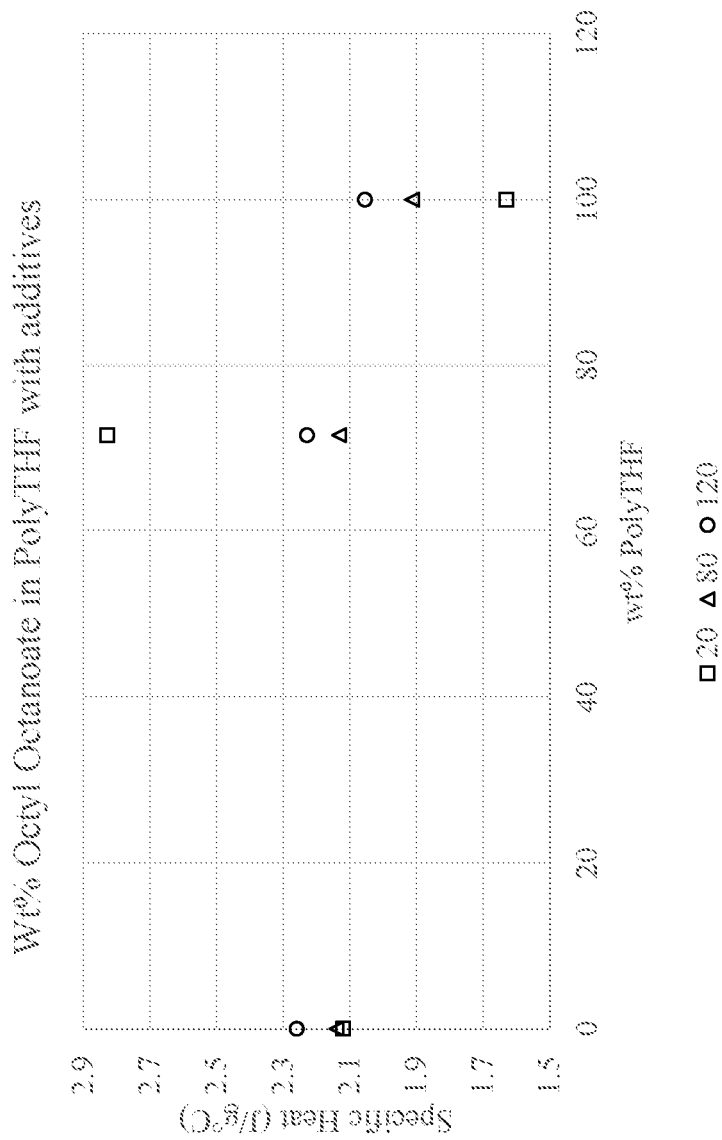
FIG. 2 shows heat capacities for various mixtures octyl octanoate with polytetrahydrofuran.

FIG. 2 shows the measured heat capacities. As shown in FIG. 2, at 20° C. a substantial increase in heat capacity for the mixture was observed relative to the expected heat capacity based on a weighted average of the components. At 80° C. and 120° C., the heat capacity for the mixture is closer to the value that would be expected based on a weighted average of the heat capacities of the components. This is similar to the trends shown in Table 2 and Table 3, where increasing the temperature of a mixture appeared to decrease the synergistic increase in heat capacity.

Comparative Example 4—Mixture of Adipate Ester with Lubricant Base Stock Based on Poly-Alpha-Olefins Mixtures of 10 wt % adipate ester and 90 wt % polyalphaolefin lubricant base stock were produced and characterized. Adipate ester is a hydrogen bond acceptor, while polyalphaolefin lubricant base stock does not include heteroatom functional groups, so it is neither a hydrogen bond donor or a hydrogen bond acceptor. The heat capacities of the adipate ester and the polyalphaolefin lubricant base stock were also separately characterized. The heat capacities were measured at 25° C., 60° C., and 80° C.

Figure 3:
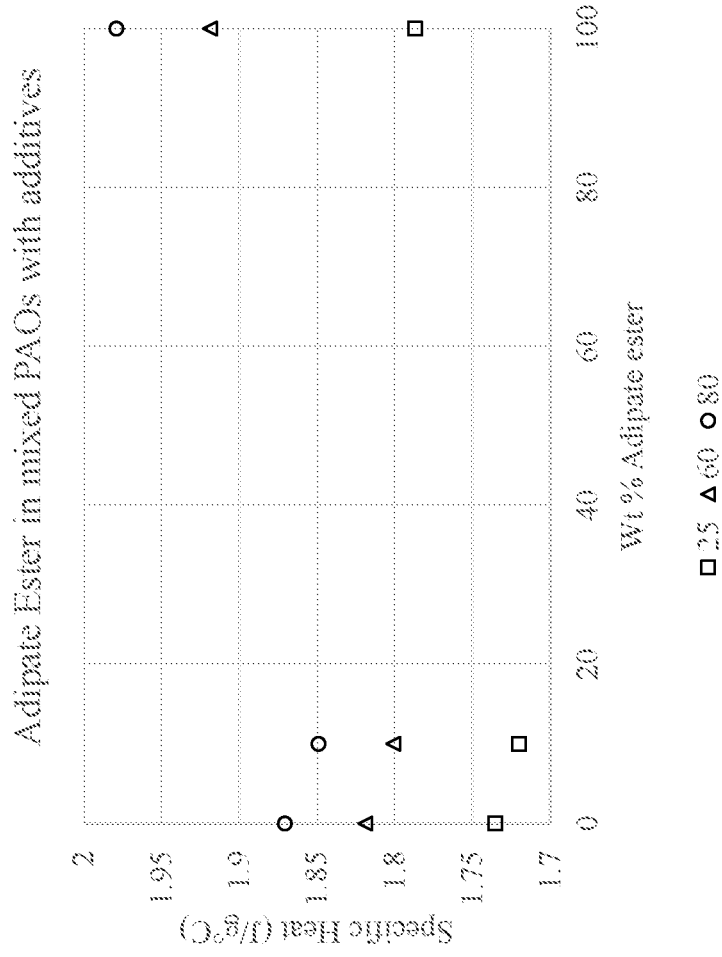
FIG. 3 shows a comparative example of heat capacities for various mixtures of an adipate ester with a mix of polyalpha-olefins.

FIG. 3 shows the measured heat capacities. As shown in FIG. 3, the mixture of adipate ester and polyalphaolefin lubricant base stock had a lower heat capacity than the expected value at the various temperatures.

Comparative Example 5—Mixture of Water and Ethylene Glycol

Figure 4:
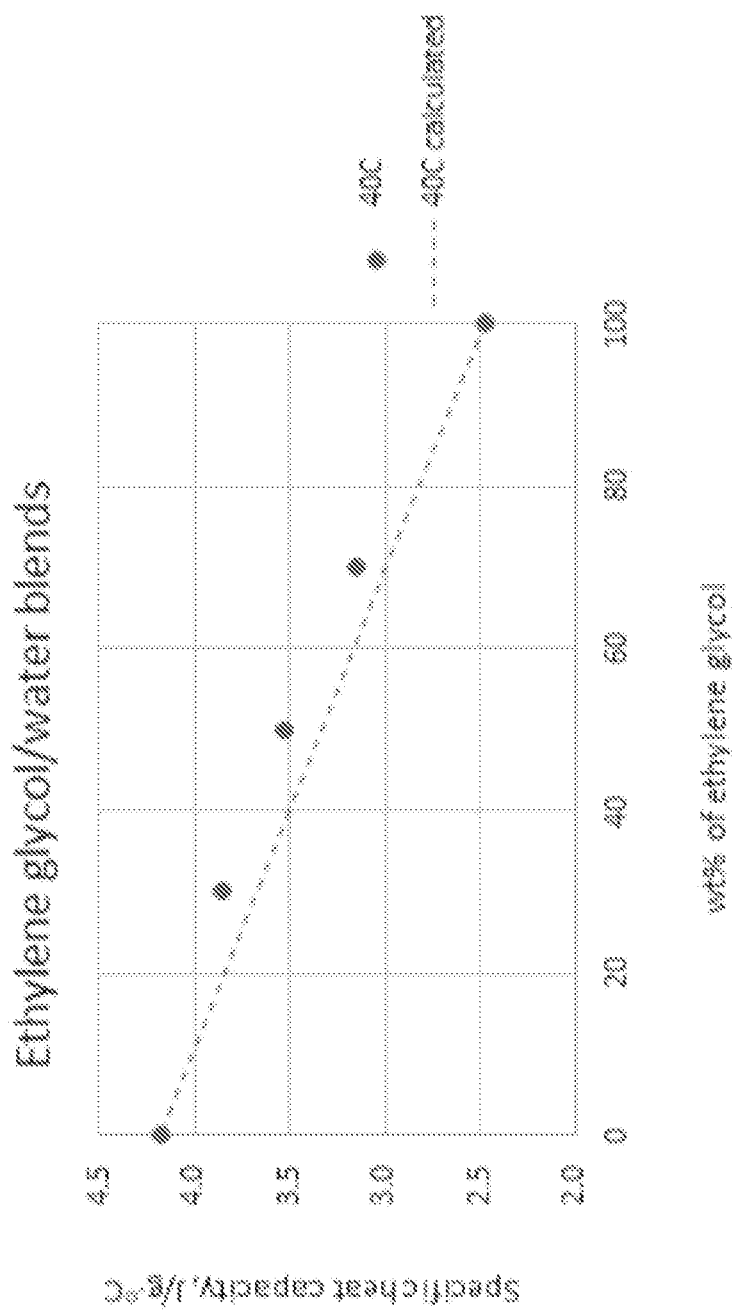
FIG. 4 shows a comparative example of heat capacities for mixtures of water with ethylene glycol.

FIG. 4 shows heat capacities for mixtures of water and ethylene glycol, as reported in a literature reference. Because water is not an organic compound, water falls outside of the definitions provided herein for hydrogen bond donor and hydrogen bond acceptor. This reflects the fact that the mixtures provided herein are mixtures suitable for use in environments where electrical conductivity is generally not desirable. Due to the hydrogen bonding capabilities of water and/or the ability of water to facilitate hydrogen bonding, a modest synergy in heat capacity for mixtures of water and ethylene glycol is shown in FIG. 4.

Additional Embodiments

Embodiment 1. A heat transfer fluid, comprising: 10 wt % to 90 wt %, relative to a weight of the heat transfer fluid, of at least one hydrogen bond donor having a molecular weight of 60 g/mol or more and a first heat capacity, the at least one hydrogen bond donor comprising 1.0 wt % or more of hydrogen bond donor functional groups relative to the molecular weight of the at least one hydrogen bond donor; 10 wt % to 90 wt %, relative to a weight of the heat transfer fluid, of at least one hydrogen bond acceptor having a molecular weight of 60 g/mol or more and a second heat capacity, the at least one hydrogen bond acceptor comprising 1.0 wt % or more of hydrogen bond acceptor functional groups relative to the molecular weight of the at least one hydrogen bond acceptor; and an electrical conductivity of the heat transfer fluid being 2.0 µS/cm or less, wherein, a) the hydrogen bond donor does not contain hydrogen bond acceptor functional groups, or b) the hydrogen bond donor comprises one or more hydrogen bond acceptor functional groups, and 10 wt % or more of the hydrogen bond acceptor functional groups in the hydrogen bond acceptor, relative to the molecular weight of the hydrogen bond acceptor, are different from the hydrogen bond acceptor functional groups in the hydrogen bond donor.

Embodiment 2. The heat transfer fluid of any of the above embodiments, wherein a combined weight of the at least one hydrogen bond donor and the at least one hydrogen bond acceptor comprises 40 wt % or more of a weight of the heat transfer fluid.

Embodiment 3. The heat transfer fluid of any of the above embodiments, wherein a weight of hydrogen bond donor functional groups of the at least one hydrogen bond donor comprises 5 wt % or more (or 10 wt % or more) of the molecular weight of the at least one hydrogen bond donor, and wherein a weight of hydrogen bond acceptor functional groups of the at least one hydrogen bond acceptor comprises 5 wt % or more (or 10 wt % or more) of the molecular weight of the at least one hydrogen bond acceptor.

Embodiment 4. The heat transfer fluid of any of the above embodiments, wherein 70 wt % or more of a combined weight of the at least one hydrogen bond donor and the at least one hydrogen bond acceptor comprises $C_{5+}$ compounds, relative to the combined weight of the at least one hydrogen bond donor and the at least one hydrogen bond acceptor.

Embodiment 5. The heat transfer fluid of any of the above embodiments, wherein the at least one hydrogen bond donor comprises a melting point of −50° C. or lower, or wherein the at least one hydrogen bond acceptor comprises a melting point of −50° C. or lower, or a combination thereof.

Embodiment 6. The heat transfer fluid of any of the above embodiments, wherein the heat transfer fluid is substantially free of water.

Embodiment 7. The heat transfer fluid of any of the above embodiments, i) wherein the at least one hydrogen bond donor comprises an alcohol; ii) wherein the at least one hydrogen bond acceptor comprises an ether, an ester, a ketone, an aldehyde, a phosphite ester, a phosphate ester, or a combination thereof; or iii) a combination of i) and ii).

Embodiment 8. The heat transfer fluid of any of the above embodiments, wherein the at least one hydrogen bond donor comprises a boiling point of 120° C. or more, or wherein the at least one hydrogen bond acceptor comprises a boiling point of 120° C. or more, or a combination thereof.

Embodiment 9. The heat transfer fluid of any of the above embodiments, wherein the at least one hydrogen bond donor comprises a boiling point between 300° C. to 565° C., or wherein the at least one hydrogen bond acceptor comprises a boiling point between 300° C. to 565° C., or a combination thereof.

Embodiment 10. The heat transfer fluid of any of the above embodiments, wherein the hydrogen bond donor comprises a molecular weight of 87 g/mol or more, or wherein the heat transfer fluid comprises a kinematic viscosity at 100° C. of 0.5 cSt to 25.0 cSt, or a combination thereof.

Embodiment 11. The heat transfer fluid of any of the above embodiments, wherein a heat capacity of the heat transfer fluid at a temperature between 0° C. and 150° C. is greater than the first heat capacity at the temperature between 0° C. to 150° C. by 5.0% or more relative to the first heat capacity, and the heat capacity of the heat transfer fluid at the temperature between 0° C. and 150° C. is greater than the second heat capacity at the temperature between 0° C. to 150° C. by 5% or more relative to the second heat capacity.

Embodiment 12. A method for using a heat transfer fluid comprising: circulating a heat transfer fluid according to any of Embodiments 1-11 in a heat transfer system.

Embodiment 13. The method of Embodiment 12, wherein the heat transfer system comprises a system for circulating a lubricant.

Embodiment 14. The method of Embodiment 12 or 13, wherein the heat transfer fluid is circulated in the heat transfer system at a temperature between −40° C. and 150° C., or wherein the heat transfer fluid is circulated in the heat transfer system at a temperature between 0° C. and 100° C.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A heat transfer fluid, comprising:
25 wt % to 90 wt %, relative to a weight of the heat transfer fluid, of at least one hydrogen bond donor having a molecular weight of 60 g/mol or more and a first heat capacity, the at least one hydrogen bond donor comprising 1.0 wt % or more of hydrogen bond donor functional groups relative to the molecular weight of the at least one hydrogen bond donor; and
10 wt % to 75 wt %, relative to a weight of the heat transfer fluid, of at least one hydrogen bond acceptor having a molecular weight of 60 g/mol or more and a second heat capacity, the at least one hydrogen bond acceptor comprising 1.0 wt % or more of hydrogen bond acceptor functional groups relative to the molecular weight of the at least one hydrogen bond acceptor; and
an electrical conductivity of the heat transfer fluid being 2.0 µS/cm or less,
wherein, a) the hydrogen bond donor does not contain hydrogen bond acceptor functional groups, or b) the hydrogen bond donor comprises one or more hydrogen bond acceptor functional groups, and 10 wt % or more of the hydrogen bond acceptor functional groups in the hydrogen bond acceptor, relative to the molecular weight of the hydrogen bond acceptor, are different from the hydrogen bond acceptor functional groups in the hydrogen bond donor, and i) wherein the hydrogen bond donor comprises at least one hydrogen bond donor selected from the group consisting of an alcohol, a carboxylic acid, a polycarboxylic acid, a primary amine, a secondary amine, and any combination thereof, and wherein the alcohol comprises:
an alcohol comprising a single alcohol functional group, a linear alkylene glycol, a polyol, a polyalkylene glycol, an ether alcohol, a hydroxyl group-terminated polyether, a hydroxyl group-terminated polyalkylene glycol ether, a hydroxyl group-terminated polyester, and any combination thereof; and ii) wherein the hydrogen bond acceptor comprises at least one hydrogen bond acceptor selected from the group consisting of an ether, a polyether, an ester, a polyester, a ketone, an aldehyde, a carbonate, a phosphite ester, a phosphate ester, a tertiary amine, and any combination thereof.

2. The heat transfer fluid of claim 1, wherein a combined weight of the at least one hydrogen bond donor and the at least one hydrogen bond acceptor comprises 40 wt % or more of a weight of the heat transfer fluid.

3. The heat transfer fluid of claim 1, wherein a weight of hydrogen bond donor functional groups of the at least one hydrogen bond donor comprises 5 wt % or more of the molecular weight of the at least one hydrogen bond donor, and wherein a weight of hydrogen bond acceptor functional groups of the at least one hydrogen bond acceptor comprises 5 wt % or more of the molecular weight of the at least one hydrogen bond acceptor.

4. The heat transfer fluid of claim 1, wherein 70 wt % or more of a combined weight of the at least one hydrogen bond donor and the at least one hydrogen bond acceptor comprises C5+ compounds, relative to the combined weight of the at least one hydrogen bond donor and the at least one hydrogen bond acceptor.

5. The heat transfer fluid of claim 1, wherein the at least one hydrogen bond donor comprises a melting point of −50° C. or lower, or wherein the at least one hydrogen bond acceptor comprises a melting point of −50° C. or lower, or a combination thereof.

6. The heat transfer fluid of claim 1, wherein the heat transfer fluid is substantially free of water.

7. The heat transfer fluid of claim 1, i) wherein the at least one hydrogen bond donor comprises the alcohol; ii) wherein the at least one hydrogen bond acceptor comprises the ether, the polyether, the ester, the polyester, the ketone, the aldehyde, the carbonate, the phosphite ester, the phosphate ester, the tertiary amine, or a combination thereof; or iii) a combination of i) and ii).

8. The heat transfer fluid of claim 1, wherein the at least one hydrogen bond donor comprises a boiling point of 120° C. or more, or wherein the at least one hydrogen bond acceptor comprises a boiling point of 120° C. or more, or a combination thereof.

9. The heat transfer fluid of claim 1, wherein the at least one hydrogen bond donor comprises a boiling point between 300° C. to 565° C., or wherein the at least one hydrogen bond acceptor comprises a boiling point between 300° C. to 565° C., or a combination thereof.

10. The heat transfer fluid of claim 1, wherein the hydrogen bond donor comprises a molecular weight of 87 g/mol or more, or wherein the heat transfer fluid comprises a kinematic viscosity at 100° C. of 0.5 cSt to 25.0 cSt, or a combination thereof.

11. The heat transfer fluid of claim 1, wherein a heat capacity of the heat transfer fluid at a temperature between 0° C. and 150° C. is greater than the first heat capacity at the same temperature, and
wherein the heat capacity of the heat transfer fluid at the temperature between 0° C. and 150° C. is greater than the second heat capacity at the same temperature.

12. A method for using a heat transfer fluid comprising: circulating a heat transfer fluid according to claim 1 in a heat transfer system.

13. The method of claim 12, wherein the heat transfer system comprises a system for circulating a lubricant.

14. The method of claim 12, wherein the heat transfer fluid is circulated in the heat transfer system at a temperature between −40° C. and 150° C.

15. The method of claim 1, wherein:
the alcohol comprising a single alcohol functional group comprises at least one alcohol selected from the group consisting of a β-alkylated primary alcohol, dodecanol, 2-hydroxyoctadecanoic acid, methyl 12-hydroxystearate, and any combination thereof;
the linear alkylene glycol comprises ethylene glycol;
the polyalkylene glycol comprises at least one polyalkylene glycol selected from the group consisting of polyethylene glycol, polypropylene glycol, polytetrahydrofuran, and any combination thereof;
the ether alcohol comprises polyoxypropylene 15 stearyl ether;
the hydroxyl group-terminated polyalkylene glycol ether comprises polypropylene glycol monobutyl ether;
the carboxylic acid comprises at least one carboxylic acid selected from the group consisting of steric acid, oleic acid, and any combination thereof;
the ester comprises at least one ester selected from the group consisting of glyceryl monooleate, octyl octanoate, 2-ethylhexyl benzoate, an adipate ester, diisodecyl phthalate, diisononyl phthalate, and any combination thereof;
the polyester comprises an estolide;
the carbonate comprises bis(2-ethylhexyl) carbonate; and/or
the phosphate ester comprises at least one phosphate ester selected from the group consisting of tricresyl phosphate, tributyl phosphate, or any combination thereof.

16. The method of claim 1, wherein:
the hydrogen bond donor comprises a β-alkylated primary alcohol, a linear alkylene glycol, a polyalkylene glycol, a hydroxyl group-terminated polyester, or any combination thereof; and/or
the hydrogen bond acceptor comprises a hydroxyl-terminated polyalkylene glycol ether, a carbonate, an ester, or any combination thereof.

* * * * *